United States Patent

Sola et al.

[11] Patent Number: 5,837,901
[45] Date of Patent: Nov. 17, 1998

[54] RECONFIGURABLE SUPPORTING FIXTURE, PARTICULARLY FOR A MEASURING MACHINE, AND RELATIVE CONFIGURATION METHOD

[75] Inventors: Domenico Sola, Rivalta; Pasqualino Poggi, Moncalieri, both of Italy

[73] Assignee: Dea-Brown & Sharpe S.p.A., Italy

[21] Appl. No.: 811,216

[22] Filed: Mar. 5, 1997

[30] Foreign Application Priority Data

Mar. 5, 1996 [IT] Italy .................................. TO96A0161

[51] Int. Cl.⁶ ........................................................ G01B 5/20
[52] U.S. Cl. ............................ 73/856; 269/21; 269/289 R
[58] Field of Search .............................. 73/11.04, 11.09, 73/669, 763, 831, 846, 852, 853, 856, 857, 865.3; 269/21, 63, 289 R, 303, 305

[56] References Cited

U.S. PATENT DOCUMENTS

| | | | |
|---|---|---|---|
| 3,957,263 | 5/1976 | Christl | 269/21 |
| 4,723,766 | 2/1988 | Beeding | 269/21 |
| 4,733,462 | 3/1988 | Kawatani | 269/21 |
| 4,805,887 | 2/1989 | Ray | 269/21 |
| 4,848,005 | 7/1989 | Ercole et al. | |
| 5,120,033 | 6/1992 | Shoda | 269/21 |
| 5,141,212 | 8/1992 | Beeding | 269/21 |
| 5,143,360 | 9/1992 | Wilken et al. | 269/21 |
| 5,222,719 | 6/1993 | Effner | 269/21 |
| 5,346,193 | 9/1994 | Kitagawa | 269/21 |
| 5,364,083 | 11/1994 | Ross et al. | 269/21 |
| 5,457,868 | 10/1995 | Blaimschein | 269/21 |
| 5,471,279 | 11/1995 | Takizawa | 269/21 |
| 5,487,536 | 1/1996 | McEachin | 269/21 |
| 5,499,802 | 3/1996 | Haberle | 269/305 |
| 5,505,438 | 4/1996 | Baldwin et al. | 269/305 |
| 5,553,837 | 9/1996 | Kahle | 269/21 |
| 5,685,513 | 11/1997 | Tsukushi | 269/21 |

*Primary Examiner*—Ronald L. Biegel
*Assistant Examiner*—Eric S. McCall
*Attorney, Agent, or Firm*—Hall, Priddy & Myers

[57] ABSTRACT

A fixture for positioning and supporting parts for measurement on a measuring machine, the fixture including a number of reconfigurable supporting elements, each having a base positionable automatically on a reference surface of the measuring machine by a head of the machine itself, and a column, which is adjustable in height by means of a reference tool, and is subsequently fitted to a respective base.

10 Claims, 6 Drawing Sheets

RECONFIGURABLE SUPPORTING FIXTURE, PARTICULARLY FOR A MEASURING MACHINE, AND RELATIVE CONFIGURATION METHOD

BACKGROUND OF THE INVENTION

The present invention relates to a reconfigurable fixture for supporting and positioning parts, especially, but not exclusively, parts for measurement on a measuring machine.

In the following description, reference is made to the above application for the sake of simplicity and purely by way of example.

As is known, parts for measurement are positioned and secured to the bed of a measuring machine by means of supporting fixtures, which are normally dedicated and —particularly in the case of flexible parts deformable under their own weight, such as certain automotive body parts— may be fairly complex and expensive by having to reproduce the on-vehicle restraint conditions of the part.

By way of an alternative to traditional dedicated fixtures, to reduce retooling costs for measuring different parts, reconfigurable fixtures have been proposed, such as the one described, for example, in Italian Patent n. 1.206.886 filed by the present Applicant.

Briefly, reconfigurable fixtures comprise a number of column type supporting elements, in turn substantially comprising a body secured, e.g. by means of magnetic stops, in a predetermined position on the reference surface, and a rod adjustable in height along an axis perpendicular to the reference surface. Both location of the body on the reference surface and the height adjustment of the rod are performed automatically by the measuring machine itself, the head of which is equipped with a positioning tool cooperating with the supporting elements.

More specifically, the positioning tool cooperates with the body of each supporting element to release the body from the reference surface for transfer to a different location on the surface, and cooperates with the rod of the supporting element to release it with respect to the body and set it to a different height.

As each supporting element is therefore configured substantially in two stages (location of the body and height adjustment of the rod), the machine is called upon to perform a fairly complex, time-consuming cycle, i.e. to successively bring the positioning tool into two different positions engaging the supporting element. As a result, reconfiguration of the entire fixture, which may comprise a fairly large number of reconfigurable supporting elements, is a long, painstaking job involving a good deal of downtime, in that, when reconfiguring the fixture, the machine must obviously be turned off.

To solve the problem, reconfigurable fixtures have been devised featuring supporting elements, which are picked up by the positioning tool, close to the top end of the rod, and comprise means for simultaneously releasing the body from the reference surface and the rod with respect to the body, so that each supporting element may be reconfigured in one gripping operation. Though reduced as compared with the previous solution, reconfiguration time can only be reduced up to a given point, owing to the fact that, being an elongated structure with the center of gravity at the bottom, and being maneuvered close to the top end, the supporting element cannot be subjected to the maximum acceleration obtainable exploiting the maximum dynamic response of the machine without incurring problems of inertia and, hence, unacceptable deformation and vibration.

Finally, Italian Patent Application n. TO94A-000209, filed on 22 Mar., 1994, by the present Applicant, relates to fixtures reconfigurable manually using, as a geometric reference, a reference tool fitted to and positioned automatically by the machine within the measuring envelope. The supporting elements are moved manually over the measuring surface, and comprise a rod adjustable manually in height, and the top end of which cooperates with the reference tool on the machine.

In this case, the fixture is simpler and cheaper, but configuration time and, hence, downtime of the machine are considerably longer.

SUMMARY OF THE INVENTION

It is an object of the present invention to provide a reconfigurable fixture, particularly for a measuring machine, designed to overcome the aforementioned drawbacks typically associated with known fixtures.

According to the present invention, there is provided a reconfigurable fixture for positioning and supporting parts on a machine comprising a reference surface and a movable unit, particularly a measuring machine; said fixture comprising:

at least one reconfigurable supporting element comprising a first portion positionable on said reference surface, and a second portion positionable with respect to said first portion in a direction perpendicular to said reference surface to adjust the overall height of said supporting element; and a positioning tool movable by said movable unit, and cooperating with said first portion of said supporting element to position the first portion on said reference surface;

characterized in that said supporting element comprises at least one intermediate body supporting said second portion and forming, with the second portion, a column adjustable in height; releasable connecting means interposed between said first portion and said intermediate body; and adjusting means for adjusting the position of said second portion with respect to said intermediate body.

The present invention also relates to a method of configuring a fixture for positioning and supporting parts on a machine comprising a reference surface and a movable unit, particularly a measuring machine; said fixture comprising at least one reconfigurable supporting element, in turn comprising a first portion positionable on said reference surface and a second portion positionable with respect to said first portion in a direction perpendicular to said reference surface to adjust the overall height of said supporting element, and a positioning tool movable by said movable unit and cooperating with said first portion of said supporting element to position the first portion on said reference surface;

the method being characterized by comprising a first step of adjusting the position of said second portion with respect to an intermediate body of said supporting element, said intermediate body supporting said second portion and forming, with the second portion, a column adjustable in height; a second step of positioning said first portion of said supporting element on said reference surface by means of said positioning tool; and a third step of assembling said column on said first portion of said supporting element via releasable connecting means.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 2:
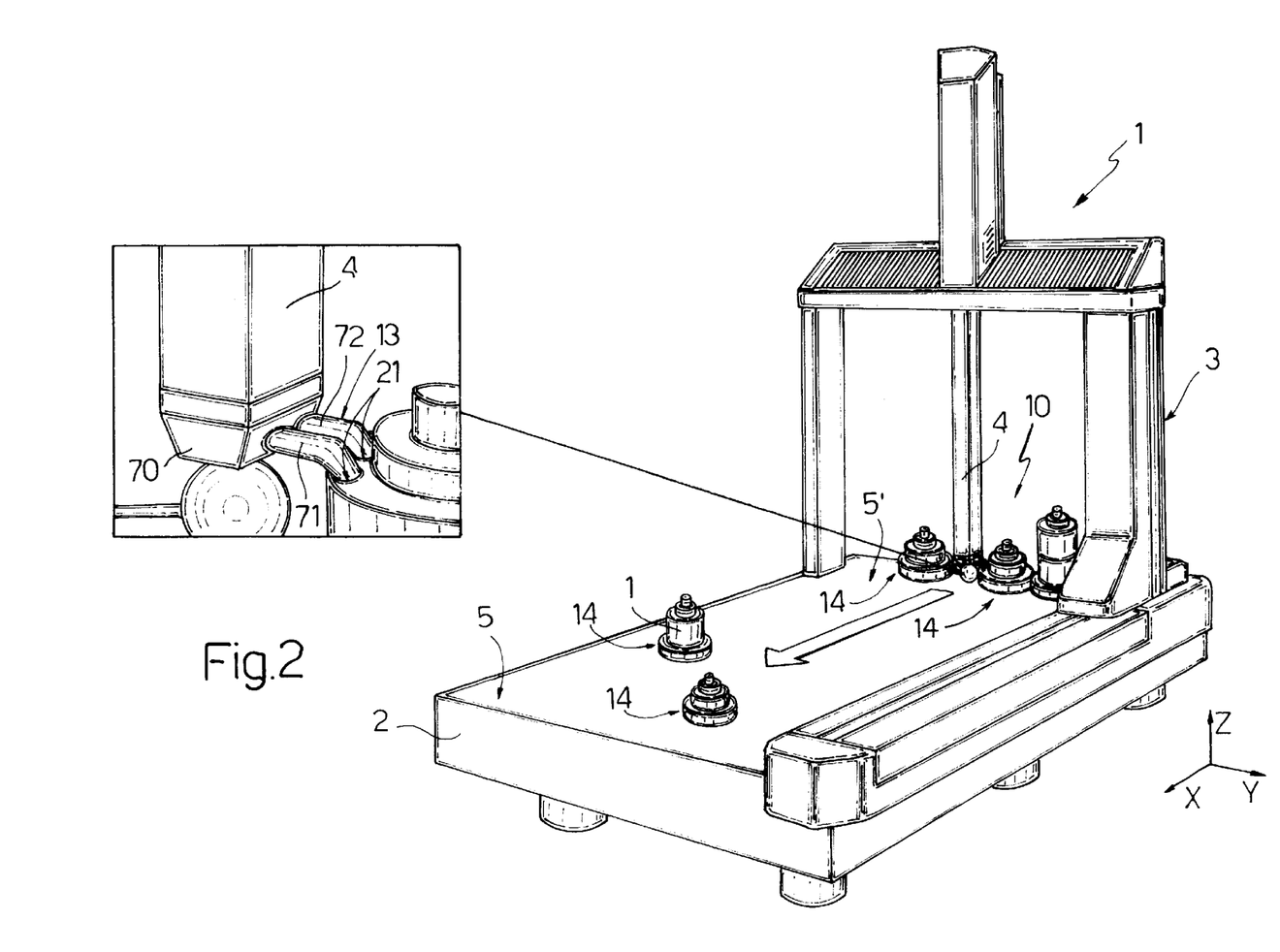
FIG. 2 shows a view in perspective of a measuring machine featuring a reconfigurable fixture in accordance with the teachings of the present invention, and at a second step in the configuration of the fixture.
Figure 3:
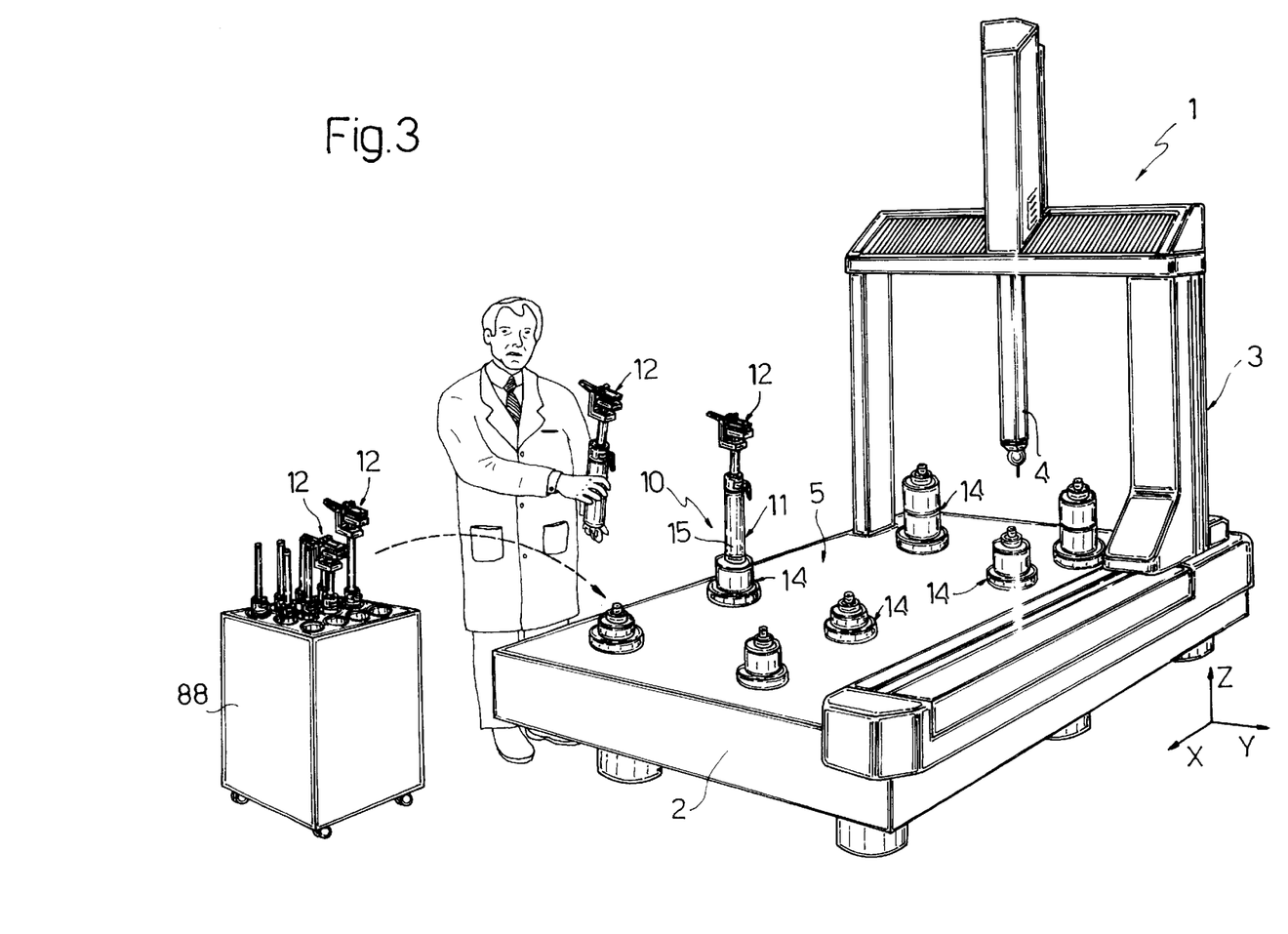
FIG. 3 shows a view in perspective of the FIG. 2 machine at a third step in the configuration of the fixture.

Number 1 in FIGS. 2 and 3 indicates a known measuring machine comprising a bed 2, and a movable, e.g. gantry type, measuring unit 3.

Unit 3 comprises a measuring head 4, which is moved by unit 3 along three coordinate axes X, Y, Z. More specifically, the X and Y axes are horizontal, perpendicular to each other, and define an X, Y reference plane coincident with a flat upper surface 5 of bed 2; and the Z axis is vertical and perpendicular to the X, Y plane. Bed 2 is made of ferromagnetic material.

Machine 1 also comprises a processing and control unit (not shown) connected to unit 3, and which provides for controlling the movement of the movable members of unit 3 along the coordinate axes according to programmable operating cycles.

Machine 1 is provided with a reconfigurable fixture 10 for supporting parts for measurement.

Fixture 10 comprises a number of supporting elements 11 adjustable in height and which are placed at predetermined locations on bed 2; a number of supporting tools 12, each fittable to a respective supporting element 11 to support, locate and/or clamp the part for measurement; and a positioning tool 13, which is fitted to measuring head 4, and cooperates with respective bottom portions 14 of supporting elements 11 when configuring the supporting elements as described later on.

Supporting element 11 is shown in more detail in FIGS. 4 to 8.

Figures 4, 5:
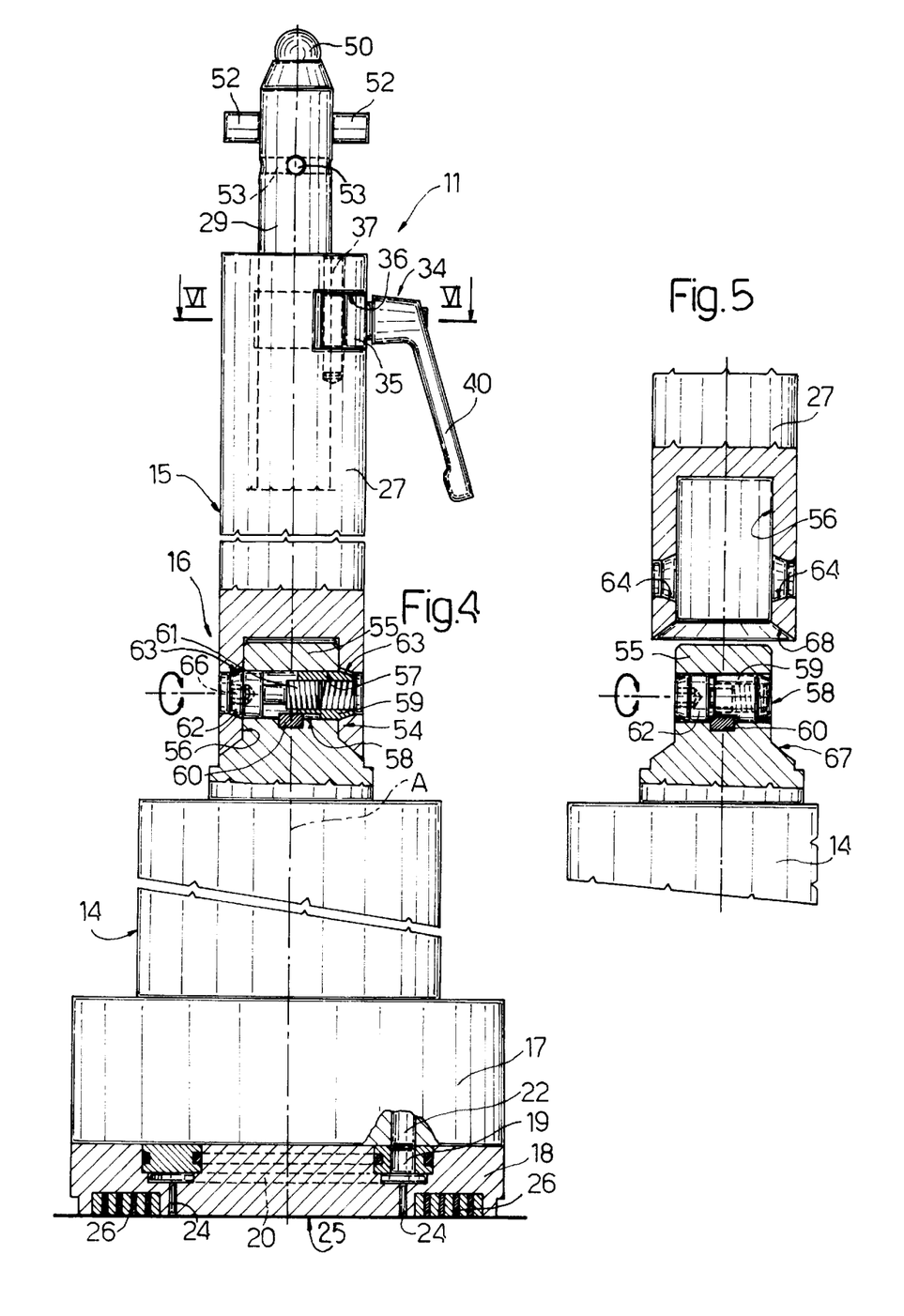
FIG. 4 shows a partly sectioned view of a supporting element forming part of the fixture according to the present invention.
FIG. 5 shows a partly sectioned, broken-down view of part of the FIG. 4 element.

According to the present invention, supporting element 11 comprises a bottom portion 14 (hereinafter referred to as "base 14" for the sake of simplicity); and a column type top portion 15 (hereinafter referred to as "column 15") which is fittable releasably to base 14 by means of a connection 16.

More specifically, base 14 comprises a substantially cylindrical body 17 of axis A; and an air-cushion pad 18 fitted to the bottom face of body 17 and defining a support by which to slide base 14.

Pad 18 (FIG. 4) comprises, in known manner, a compressed air inlet 19, and a number of inner channels 20 for supplying air to nozzles 24, which terminate at the bottom face 25 of the pad facing reference surface 5, and provide for forming, in use, an air gap supporting base 14. Pad 18 also comprises permanent magnets 26 facing bed 2 and which cooperate magnetically with the bed to clamp pad 18 in the absence of air supply to the pad.

At the top, body 17 comprises a pair of side by side, peripheral holes 21 (FIG. 2), one of which is connected by an inner conduit 22 (FIG. 4) to inlet 19 of pad 18.

Column 15 substantially comprises a cylindrical liner 27 coaxial, in use, with body 17 of base 14, and having an open-topped axial cavity 28; and a cylindrical rod 29 housed in rotary and axially-sliding manner inside cavity 28.

Rod 29 is supported radially inside cavity 28 by a pair of bushes 30 (only one shown in FIG. 6) housed inside the cavity, and may be locked axially in a given position by means of a lock device 34.

Figure 6:
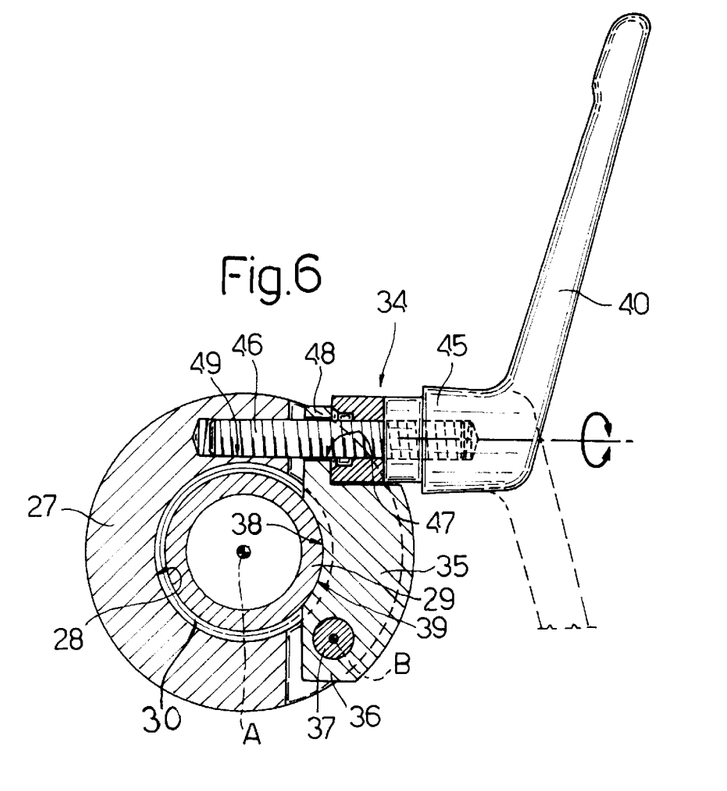
FIG. 6 shows a section along line VI—VI in FIG. 4.
Figure 7:
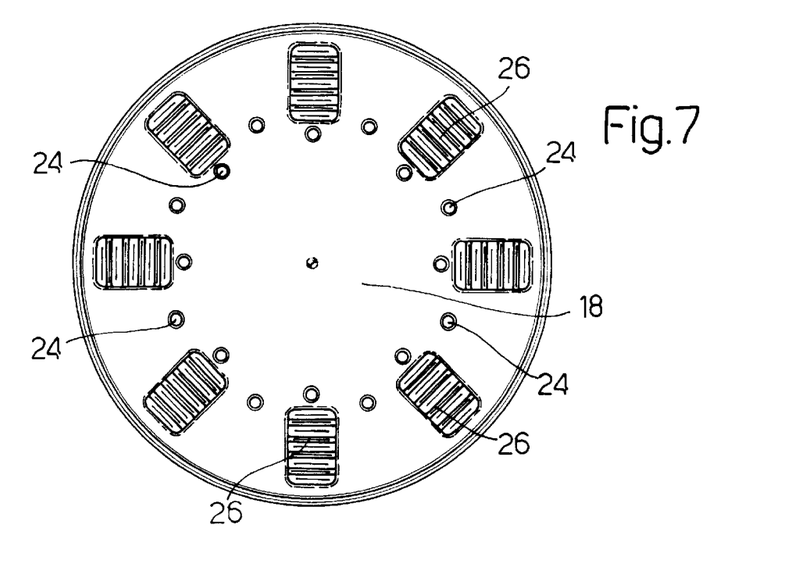
FIG. 7 shows a bottom plan view of the FIG. 4 element.

Device 34 substantially comprises a jaw 35 housed inside an opening 36 formed in liner 27, between bushes 30. Jaw 35 is hinged at a lateral end 36 about a pin 37 of axis B parallel to axis A, and comprises an inner surface 38 of the same shape as a portion 39 of the outer surface of rod 29.

Device 34 also comprises a lock handle 40, one end 45 of which is fitted rigidly with a screw 46 fitted through a hole 47 formed in the opposite end 48 of jaw 35, and screwed inside a threaded hole 49 in liner 27.

Rod 29 comprises, in known manner, a spherical end head 50; is fitted, close to the head, with a pair of diametrically opposed, radial appendixes 52; and has a pair of diametrical holes 53 intersecting each other perpendicularly.

Base 14 and column 15 are connectable to each other rigidly but releasably by means of an expansion coupling 54 interposed between the base and column (FIG. 4).

Coupling 54 substantially comprises a substantially cylindrical shank 55 integral and coaxial with body 17 of base 14; and a complementary shaped seat 56 formed in the bottom of liner 27 of column 15. Shank 55 comprises a diametrical through hole 57 housing an expansion clamping device 58.

Device 58 comprises a screw-nut screw pair, wherein the nut screw comprises an internally-threaded bush 59 connected prismatically to hole 57 by a key 60, and the screw comprises a rod 61 screwed inside bush 59 and having a head 62. Bush 59 and head 62, which are of such an outside diameter as to slide freely but with a minimum radial clearance inside hole 57, comprise respective opposite conical end portions 63, which, when the screw-nut screw pair is loosened (FIG. 4), project axially on opposite sides of shank 55 to engage respective conical seats 64 formed inside liner 27 in diametrically opposite portions of seat 56. Head 62 comprises a hexagonal socket seat 66 for a control wrench (not shown); and shank 55 comprises a conical annular bottom surface 67, which cooperates with a conical annular end surface 68 of liner 27.

To support parts requiring retention at points located at different heights, provision may conveniently be made for two or more types of base 14 having respective bodies 17 of different heights (FIGS. 2, 3 and 8), and for modular elements 17', which may be placed one on top of the other and connected by means of couplings 54 of the type described.

Tools 12 for supporting and/or clamping the part for measurement are known, for example, from aforementioned Italian Patent n. 1.206.886, and therefore not described in detail. Each tool 12 is fitted to the top end of rod 29 of a respective supporting element, so as to cooperate with spherical head 50 and appendixes 52 in a definite, stable, mutually engaged position, and with holes 53 to clamp the two parts in relation to each other.

Positioning tool 13, shown schematically in the enlarged detail in FIG. 2, comprises a body 70 fitted to measuring head 4; and a pair of drive fingers 71, 72 projecting from body 70 and cooperating with holes 21 in body 17 of base 14. Finger 71 comprises an inner conduit (not shown) which is connected to a compressed air source (not shown) by valve means (not shown) driven by the control unit; while finger 72 performs a purely mechanical drive function.

Figure 1:
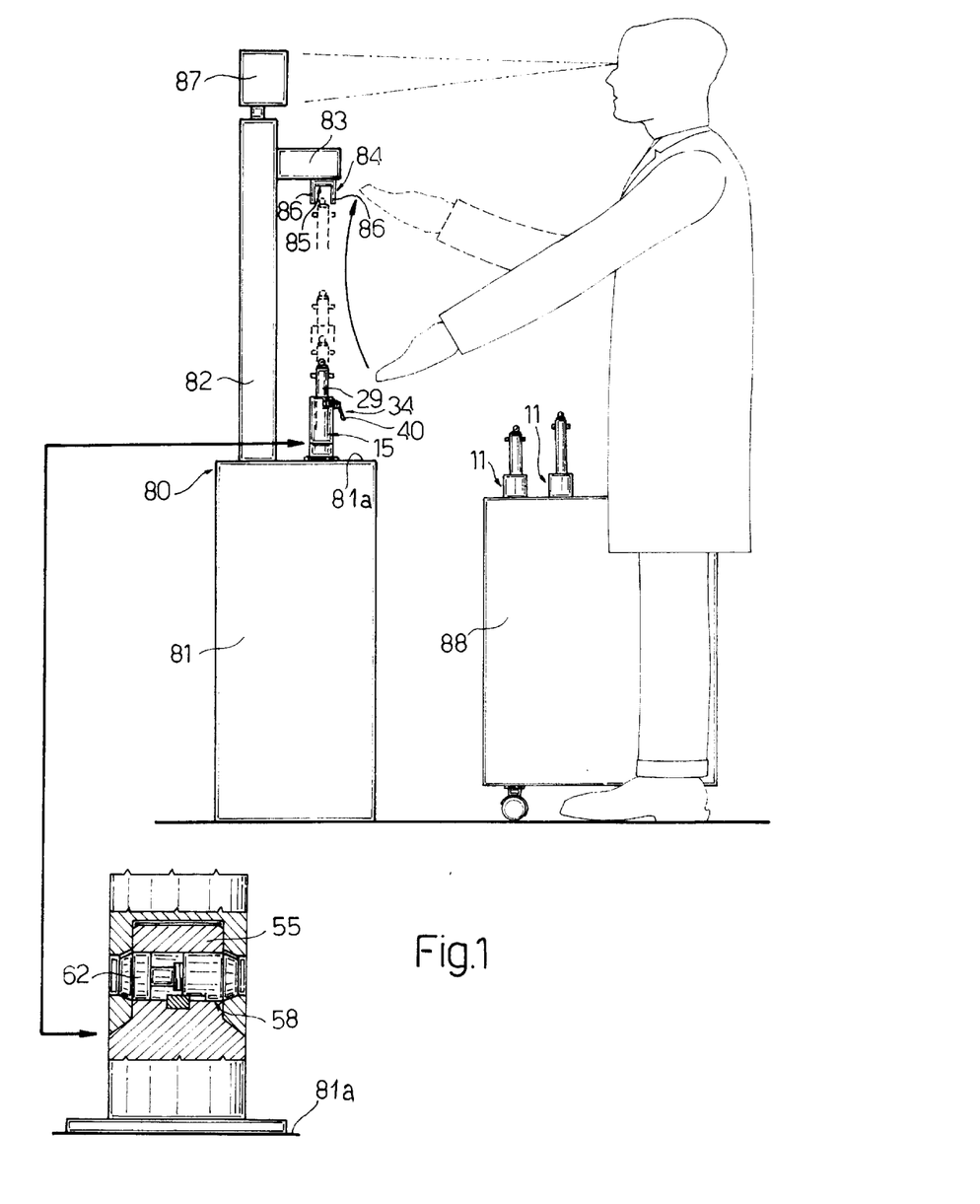
FIG. 1 shows, schematically, a first step in the configuration of a fixture in accordance with the present invention.

FIG. 1 shows a preconfiguration fixture 80 comprising a bed 81, and a vertical column 82 along which travels a slide 83.

On a table 81a at the top, bed 81 comprises a shank 55 identical to that of coupling 54 and having a respective clamping device 58; and slide 83 is fitted underneath with a reference tool 84, which cooperates with rod 29 in a definite mutually engaged position. For example, tool 84 may comprise a horizontal bottom surface 85 for mating with spherical head 50; and a pair of lateral walls 86 having respective vertical slots (not shown) engaged by appendixes 52 of rod 29. Fixture 80 may conveniently be provided with a display screen 87 connected to an electronic detecting circuit (not shown) and enabling the operator to monitor the vertical coordinate of slide 83.

Operation of fixture 10, with particular reference to the configuration steps, will now be described as of an initial condition in which bases 14, without respective columns 15, are located in a peripheral standby area 5' of bed 2 (FIG. 2), and the columns, without respective supporting tools 12, are conveniently housed in a movable store 88.

The first step comprises setting columns 15 to a predetermined configuration according to the geometry of the part to be supported, i.e. each column 15 is preconfigured in height using fixture 80.

That is, each column 15 is fitted onto shank 55 of fixture 80 and clamped by means of head 62 of clamping device 58 of fixture 80.

Lock device 34 is then released by means of handle 40 to release rod 29, which is raised manually to contact surface 85 of reference tool 84, and is rotated so that appendixes 52 engage the respective reference slots. Once engaged correctly with reference tool 84, rod 29 is again locked by means of lock device 34 to terminate the preconfiguration step of column 15, which is then removed from fixture 80, fitted with respective supporting tool 12, and placed inside movable store 88. The above operation is repeated for each column 15.

The second step in the configuration of fixture 10 (FIG. 2) comprises positioning bases 14 automatically on surface 5 of bed 2. To do which, measuring head 4 of movable unit 3 grips each base 14 one after the other by means of positioning tool 13, releases the base from surface 5 by supplying air to air-cushion pad 18, and sets the base to a predetermined position defined by the X, Y coordinates and the angular position of the base about its axis A. In this position, the air supply is cut off, and base 14 is again clamped to reference surface 5 by magnets 26.

At the end of the above second step, the operator fits each column 15, fitted with respective supporting tool 12, onto respective base 14 (FIG. 3), and secures the column to the base by means of clamping device 58 of respective coupling 54, so that rod 29 of each column 15 assumes, with respect to shank 55 of respective base 14, the same position (height and angular position about axis A) to which it was set with respect to shank 55 of fixture 80 at the preconfiguration step of columns 15 described previously.

This completes the configuration of fixture 10, and machine 1 is now ready to perform automatic measuring cycles of the parts supported on the fixture.

The advantages of fixture 10 and the configuration method according to the present invention will be clear from the foregoing description.

In particular, configuration of the fixture involves very little downtime of the machine, which is limited to the time taken to automatically position bases 14 and assemble columns 15. Moreover, the shape of the bases is such as to create no problems of inertia, so that the bases may be positioned extremely rapidly, exploiting the full dynamic response of the machine.

Columns 15 may be preconfigured while machine 1 is actually operating, thus constituting no downtime of the machine.

Fixture 10 is simpler and cheaper as compared with known automatic fixtures, and is faster to configure as compared with manually configured solutions.

Figure 8:
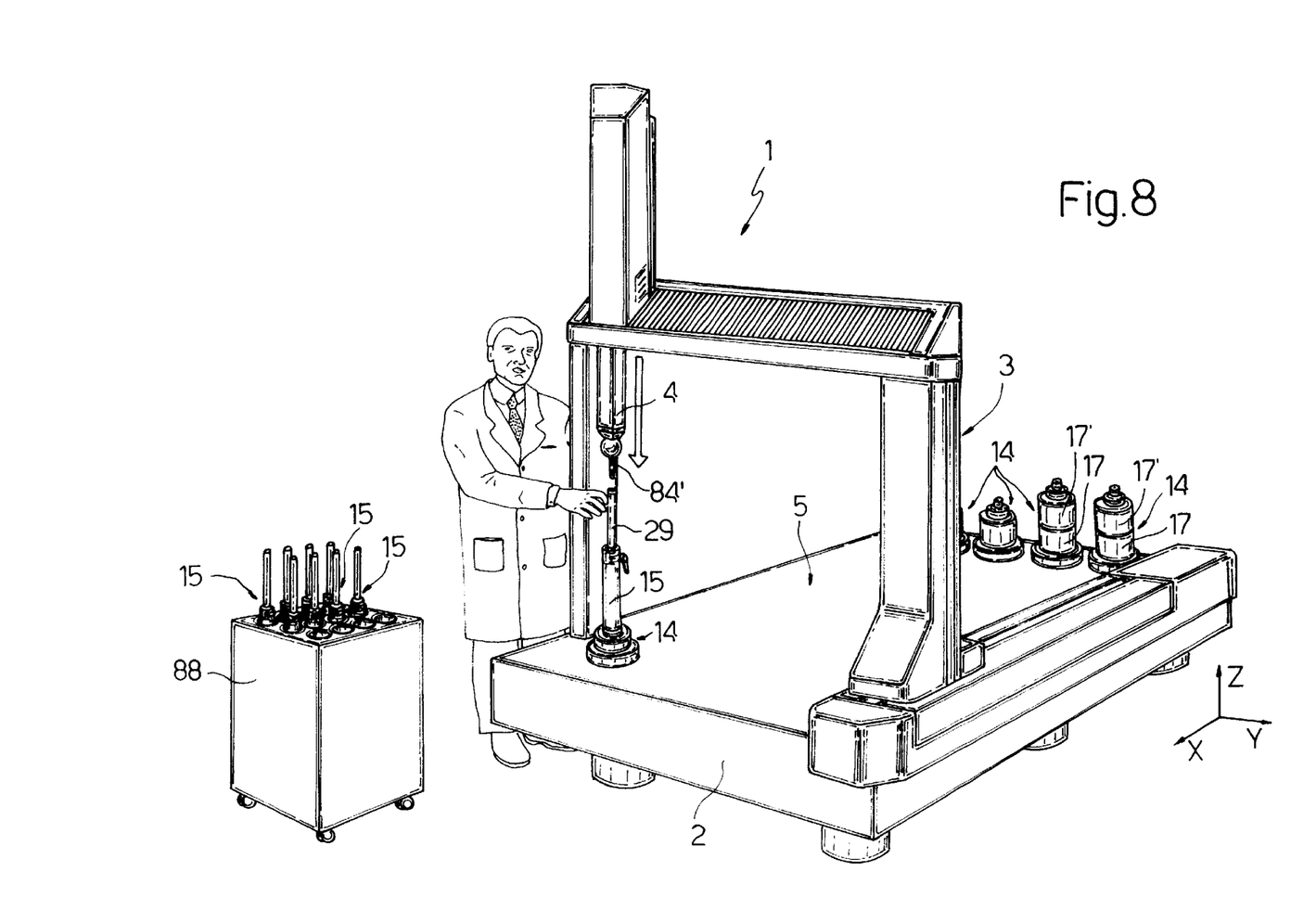
FIG. 8 shows an alternative embodiment of the first configuration step in FIG. 1.

FIG. 8 shows an alternative embodiment of the column 15 preconfiguration step, wherein machine 1 itself is used in place of fixture 80.

Each column 15 is fitted one after the other to a respective base 14 secured in a predetermined position on reference surface 5, and rod 29 is positioned with reference to a reference tool 84' fitted to measuring head 4.

Clearly, changes may be made to fixture 10 and to the configuration method as described and illustrated herein without, however, departing from the scope of the present invention.

In particular, bases 14 may be simply translated, in a constant angular position, over the X, Y reference surface by head 4; in which case, the angular position of rod 29 about axis A is adjusted at the column 15 preconfiguration step using a tool 84 or 84' with one degree of rotational freedom about a vertical axis.

Moreover, as opposed to being moved automatically by head 4, bases 14 may be positioned manually on the X, Y reference surface; in which case, positioning tool 13, still operated automatically by head 4, would simply act as a reference by which to manually position, as opposed to also physically moving, the bases.

We claim:

1. A reconfigurable fixture (10) for positioning and supporting parts on a machine (1) comprising a reference surface (5) and a movable unit (3), particularly a measuring machine; said fixture (10) comprising:

at least one reconfigurable supporting element (11) comprising a first portion (14) positionable on said reference surface (5), and a second portion (29) positionable with respect to said first portion (14) in a direction (A) perpendicular to said reference surface (5) to adjust the overall height of said supporting element (11); and a positioning tool (13) movable by said movable unit (3), and cooperating with said first portion (14) of said supporting element (11) to position the first portion (14) on said reference surface (5);

characterized in that said supporting element (11) comprises at least one intermediate body (27) supporting said second portion (29) and forming, with the second portion (29), a column (15) adjustable in height; releasable connecting means (54) interposed between said first portion (14) and said intermediate body (27) for connecting and disconnecting said intermediate body (27) from said first portion (14); and adjusting means (34) for adjusting the position of said second portion (29) with respect to said intermediate body (27).

2. A fixture as claimed in claim 1, characterized in that said releasable connecting means comprise an expansion coupling (54).

3. A fixture as claimed in claim 1, characterized in that said intermediate body comprises a tubular liner (27); said second portion comprising a rod (29) sliding inside said liner (27) and having, on a free end, position reference means (50, 52) cooperating with a reference tool (84, 84') in a definite position of mutual engagement.

4. A fixture as claimed in claim 3, characterized in that said adjusting means comprise a lock device (34) for locking said rod (29) with respect to said liner (27) in a predetermined relative position.

5. A fixture as claimed in claim 1, characterized in that said first portion (14) comprises an air-cushion pad (18) cooperating with said reference surface (5); said positioning tool (13) having air supply means (71) for supplying air to said air-cushion pad (18).

6. A fixture as claimed in claim 3, characterized in that said reference surface (5) is made of ferromagnetic material; and said pad (18) comprises at least one permanent magnet (26).

7. A method of configuring a fixture (10) for positioning and supporting parts on a machine (1) comprising a reference surface (5) and a movable unit (3), particularly a measuring machine; said fixture (10) comprising at least one reconfigurable supporting element (11), in turn comprising a first portion (14) positionable on said reference surface (5) and a second portion (29) positionable with respect to said first portion (14) in a direction (A) perpendicular to said reference surface (5) to adjust the overall height of said supporting element (11), and a positioning tool (13) movable by said movable unit (3) and cooperating with said first portion (14) of said supporting element (11) to position the first portion (14) on said reference surface (5);
the method being characterized by comprising a first step of adjusting the position of said second portion (29) with respect to an intermediate body (27) of said supporting element (11), said intermediate body (27) supporting said second portion (29) and forming, with the second portion (29), a column (15) adjustable in height; a second step of positioning said first portion (14) of said supporting element (11) on said reference surface (5) by means of said positioning tool (13); and thereafter a third step of connecting said intermediate body (27) to said first portion (14) of said supporting element (11) via releasable connecting means (54).

8. A method as claimed in claim 7, characterized in that said first step comprises the operations of clamping said intermediate body (27) of said column (15) onto a supporting device (55) and in a predetermined relative position; moving said second portion (29) with respect to said intermediate body (27) to bring said second portion (29) into a definite position of mutual engagement with a reference tool (84, 84') located in a predetermined position with respect to said supporting device (55); and locking said second portion (29) with respect to said intermediate body (27).

9. A method as claimed in claim 8, characterized in that said first step is performed on a dedicated fixture (80) having said supporting device (55) and said reference tool (84).

10. A method as claimed in claim 9, characterized in that said first step is performed on said machine (1); said reference tool (84') being fitted to said movable unit (3).

* * * * *